(12) United States Patent
Harshberger et al.

(10) Patent No.: US 10,507,601 B2
(45) Date of Patent: Dec. 17, 2019

(54) TRI-LAYER BLADDER AND RELATED SYSTEMS AND METHODS FOR FABRICATING COMPOSITE STRUCTURES

(71) Applicant: Rubbercraft Corporation of California, Ltd., Long beach, CA (US)

(72) Inventors: Robert Harshberger, Lakewood, CA (US); Finley Miller, Long Beach, CA (US); Mathias Hecht, Flagstaff, AZ (US)

(73) Assignee: Rubbercraft Corporation of California, Ltd., Long Beach, CA (US)

( * ) Notice: Subject to any disclaimer, the term of this patent is extended or adjusted under 35 U.S.C. 154(b) by 171 days.

(21) Appl. No.: 15/334,220

(22) Filed: Oct. 25, 2016

(65) Prior Publication Data

US 2017/0334095 A1 Nov. 23, 2017

Related U.S. Application Data

(60) Provisional application No. 62/337,621, filed on May 17, 2016.

(51) Int. Cl.
| | | |
|---|---|---|
| B29C 33/40 | (2006.01) | |
| B29C 70/44 | (2006.01) | |
| B29D 30/06 | (2006.01) | |
| B29C 33/50 | (2006.01) | |
| B29C 33/10 | (2006.01) | |
| B29C 43/36 | (2006.01) | |

(52) U.S. Cl.
CPC ............ *B29C 33/405* (2013.01); *B29C 33/10* (2013.01); *B29C 33/505* (2013.01); *B29C 70/44* (2013.01); *B29C 70/446* (2013.01); *B29D 30/0654* (2013.01); *B29C 2043/3644* (2013.01); *B29K 2821/00* (2013.01); *B29K 2905/00* (2013.01); *B29K 2913/00* (2013.01); *B29K 2995/0065* (2013.01)

(58) Field of Classification Search
CPC ............................. B29C 33/505; B29C 70/446
See application file for complete search history.

(56) References Cited

U.S. PATENT DOCUMENTS

| | | | |
|---|---|---|---|
| 3,230,975 A * | 1/1966 | Mercier | .................... F15B 1/10 138/30 |
| 2007/0151983 A1 | 7/2007 | Patel | |
| 2010/0015265 A1 | 1/2010 | Vontell | |

(Continued)

FOREIGN PATENT DOCUMENTS

| | | |
|---|---|---|
| EP | 1308257 | 5/2003 |
| JP | 2010131864 A * | 6/2010 |

*Primary Examiner* — Robert B Davis
(74) *Attorney, Agent, or Firm* — Sheppard, Mullin, Richter & Hampton LLP

(57) ABSTRACT

Disclosed is an elastomeric bladder tool and related systems and methods. In one embodiment, the elastomeric bladder tool comprises an elastomeric inner layer substantially defining an inner cavity of the elastomeric bladder tool, an elastomeric outer layer substantially defining an outer surface of the elastomeric bladder tool, and a permeable middle layer positioned between the elastomeric inner layer and the elastomeric outer layer. The permeable middle layer has greater permeability than both the elastomeric outer layer and the elastomeric inner layer to allow for evacuating of gases that have entered the permeable middle layer.

7 Claims, 10 Drawing Sheets

(56) References Cited

U.S. PATENT DOCUMENTS

| | | | | |
|---|---|---|---|---|
| 2010/0170613 A1* | 7/2010 | Kendall | ................ | B29C 35/02 |
| | | | | 156/60 |
| 2010/0186899 A1* | 7/2010 | Jackson | ................ | B29C 33/10 |
| | | | | 156/382 |
| 2011/0277918 A1 | 11/2011 | Lee | | |
| 2016/0176073 A1* | 6/2016 | Spexarth | ................ | B29C 35/02 |
| | | | | 264/39 |

* cited by examiner

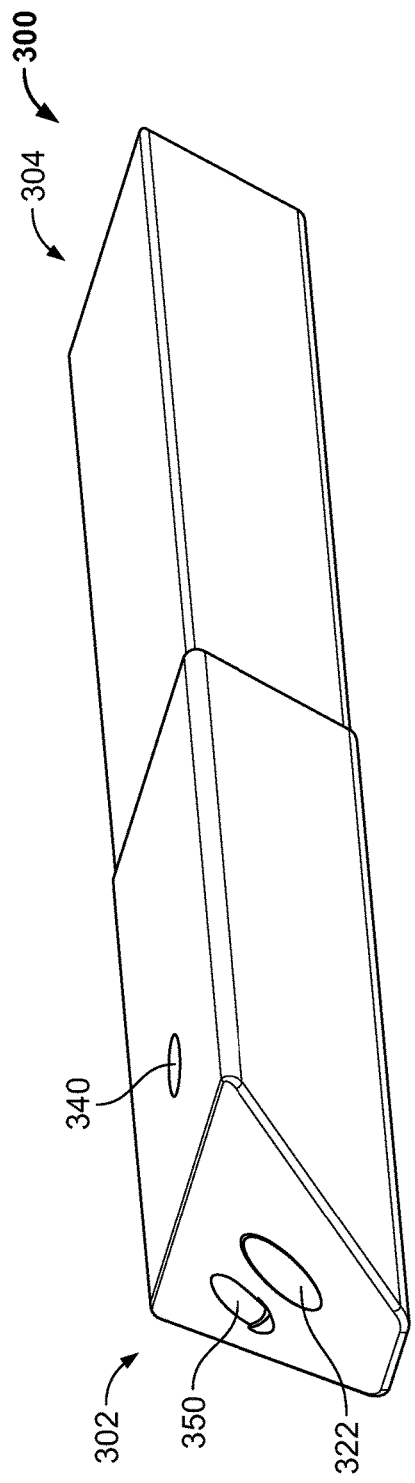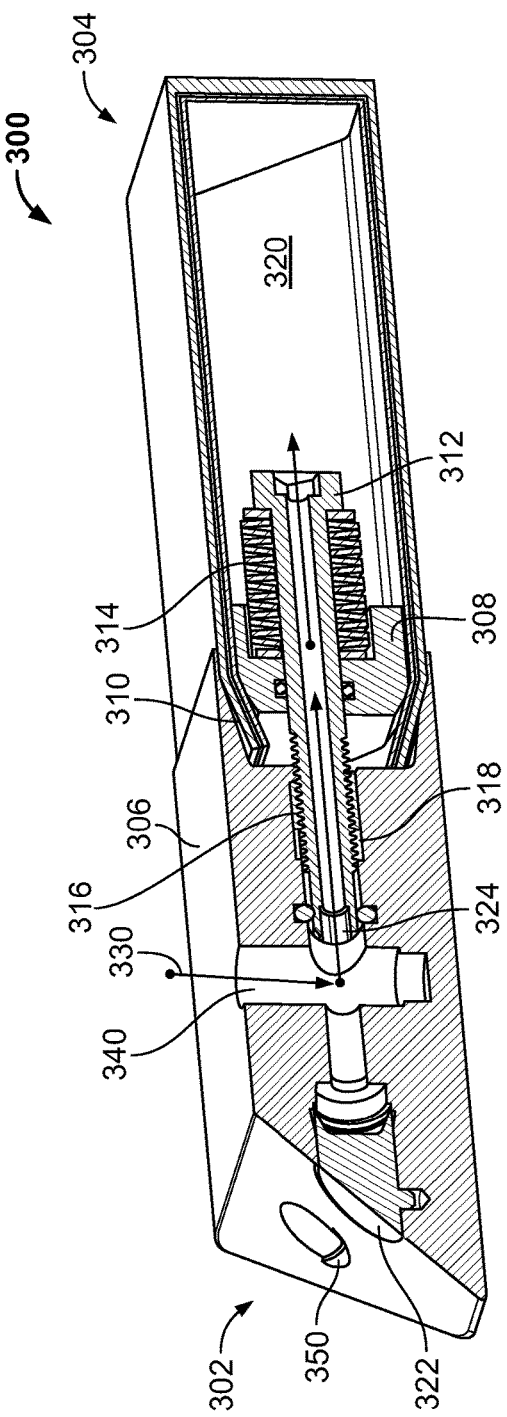

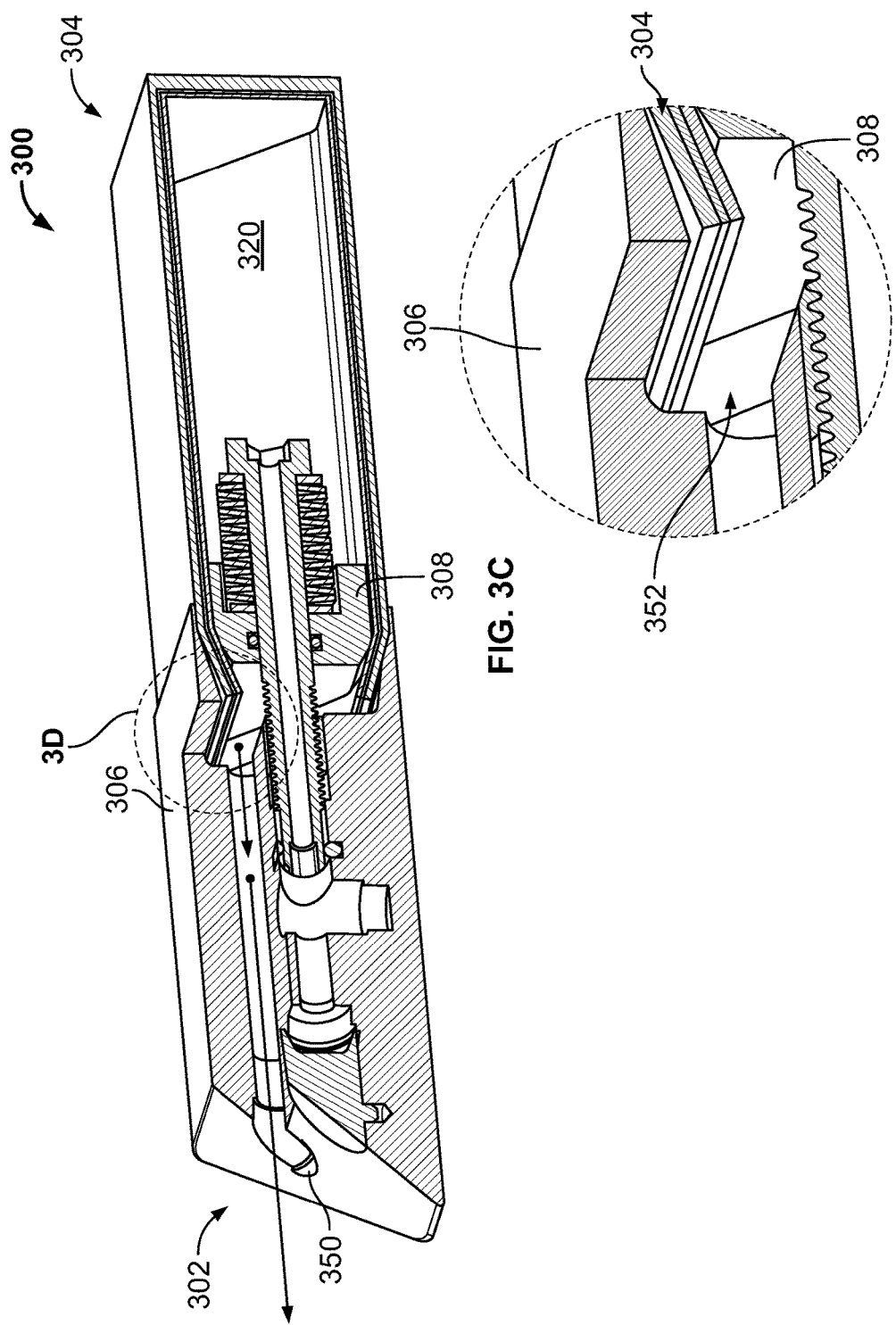

TRI-LAYER BLADDER AND RELATED SYSTEMS AND METHODS FOR FABRICATING COMPOSITE STRUCTURES

CROSS-REFERENCE TO RELATED APPLICATION

The present application claims priority to U.S. Provisional Application No. 62/337,621, filed on May 17, 2016, the entire contents of which are incorporated by reference as if fully set forth herein.

TECHNICAL FIELD

The present disclosure relates generally to the field of composites fabrication and, more particularly, to tooling for the manufacturing of composites, and even more particularly to a tri-layer bladder, and related systems and methods.

BACKGROUND

Composite materials can be used to form very durable and lightweight structures. Composite materials generally have better strength-to-weight ratios than metals such as aluminum or steel. Composite materials can also be more readily formed into complex shapes and configurations. For at least these reasons, composite materials are competitive with, if not replacing, metal materials in the manufacture of items such as tennis racquets, golf clubs, bicycle frames, and parts for automobiles, aircraft, and spacecraft.

Composite materials are typically formed of fibers (e.g., glass and/or carbon fibers) embedded in a resin matrix. The fibers introduce anisotropic mechanical properties that can be used to optimize the weight and reduce the material usage for structures. In addition, advanced composites frequently use stiffening elements or hollow features that can be co-cured or co-bonded during the composite consolidation process, eliminating secondary fastening and bonding operations.

A common challenge for fabricating composite structures is the need for tooling that, while initially trapped in cavities within the composite structure, can be extracted after the curing process. Elastomeric tooling can be used that permits removal through openings in the composite structure due to the elastomeric tooling's ability to change cross-section when a force is applied, such as a vacuum or a pull force on an end. Elastomeric tooling can also allow pressure to be transferred in a controlled manner to a laminate or a surface of a composite structure, which can be critical for the composite fabrication process.

A technical problem related to elastomeric tooling is the gas permeability of the elastomeric material. The permeability increases with temperature and is significantly higher at the elevated temperatures used during composite manufacturing processes. At the same time, the less permeable elastomeric materials are not able to withstand repeated uses at high temperatures. The relatively soft elastomeric material can also be prone to mechanical damage. It is often the case that some or all of the elastomeric tooling presses against the composite structure during the curing process. In such processes, the elastomeric tooling may contain gas at a significantly higher pressure than the pressure between the composite structure and the outer surface of the elastomeric tooling. This is particularly true given that the composite structure may be under vacuum and the gas on the inside of the elastomer can be under pressure in a molding application. This can be problematic, in that it promotes gas permeation or flow through the elastomer to the composite due to the pressure differential between the gas on the inside of the elastomer and the outer surface of the elastomer on the composite side, thereby amplifying the risk of damage or quality issues of the composite material in the vicinity of the elastomeric tooling. Both the inherent gas permeability of the elastomeric material and/or possible damage to the elastomer allow gases to reach the composite and can potentially result in porosity, dry spots, and/or inadequate pressure on the composite during consolidation. Barrier layers of a low permeability material can be added to the elastomeric tooling to attempt to overcome some of these problems. However, barrier layers are generally mismatched in modulus as they are almost universally less elastic and have a different coefficient of thermal expansion than the elastomeric material they are attached to, which can lead to delamination during cure cycles and extraction. Even with such barrier layers, the elastomeric tooling is still prone to manufacturing defects and punctures, which limit the re-use of such tooling and raise the risk of gas permeation after repeated use.

Another technical problem related to elastomeric tooling is that it is difficult to discriminate between the natural permeability of the material and small punctures or other leaks. Leak check testing is often not reliable for finding small leaks as the leaks can close by self-sealing under pressure or under vacuum or be undetectable due to variation in the permeability of the elastomeric tooling. Also, the often large interior volume of the elastomeric tooling makes such checks very sensitive to changes in atmospheric pressure or ambient temperature.

SUMMARY OF THE INVENTION

The present disclosure may be embodied in an elastomeric bladder tool that comprises an elastomeric inner layer substantially defining an inner cavity of the elastomeric bladder tool, an elastomeric outer layer substantially defining an outer surface of the elastomeric bladder tool, and a permeable middle layer positioned between the elastomeric inner layer and the elastomeric outer layer. The permeable middle layer has greater permeability than both the elastomeric outer layer and the elastomeric inner layer to allow for evacuating of gases that have entered the permeable middle layer.

In an embodiment, the permeable middle layer comprises a fibrous material.

In an embodiment, the fibrous material is a woven, fibrous material.

In an embodiment, the permeable middle layer comprises a fiber selected from the group consisting of glass fibers and polymer fibers.

In an embodiment, the permeable middle layer is a textured surface on at least one of the elastomeric outer layer and the elastomeric inner layer.

In an embodiment, the elastomeric outer layer contains an embedded heater.

In an embodiment, the permeable middle layer comprises an embedded heater.

The present disclosure may also be embodied in a method in which a composite is laid on an elastomeric bladder tool. The elastomeric bladder tool may comprise an elastomeric inner layer substantially defining an inner cavity of the elastomeric bladder tool, an elastomeric outer layer substantially defining an outer surface of the elastomeric bladder tool, and a permeable middle layer positioned between the elastomeric inner layer and the elastomeric outer layer. The permeable middle layer can be connected to a low pressure source, and gas can be evacuated from between the elastomeric outer layer and the elastomeric inner layer via the permeable middle layer.

In an embodiment, connecting the permeable middle layer to a low pressure source comprises securing the elastomeric bladder tool to a vent plug assembly, and connecting the vent plug assembly to a low pressure source or a vent path that is at lower pressure than, for example, the autoclave pressure used to consolidate the composite part. The vent plug assembly can be a device terminating the bladder tool thereby providing a mechanical connection to the elastomeric bladder and forming isolated flow paths to the inside cavity of the bladder and the permeable middle layer.

In an embodiment, the vent plug assembly comprises an inner plug and a vent plug body, and securing the elastomeric bladder tool to the vent plug assembly comprises securing an open end of the elastomeric bladder tool between the inner plug and the vent plug body.

In an embodiment, when the open end of the elastomeric bladder tool is secured between the inner plug and the vent plug body, the permeable middle layer of the elastomeric bladder tool terminates within a cavity formed by the inner plug and the vent plug body.

In an embodiment, connecting the permeable middle layer to a low pressure source comprises connecting the permeable middle layer to a breather layer used in the manufacturing of the composite, wherein the breather layer is connected to a low pressure source.

The present disclosure may also be embodied in a composite fabrication system comprising: an elastomeric bladder tool, wherein the elastomeric bladder tool comprises an elastomeric inner layer substantially defining an inner cavity of the elastomeric bladder tool, an elastomeric outer layer substantially defining an outer surface of the elastomeric bladder tool, and a permeable middle layer positioned between the elastomeric inner layer and the elastomeric outer layer. The composite fabrication system can also comprise a low pressure source in communication with the permeable middle layer.

In an embodiment, the composite fabrication system further comprises a composite laid on the elastomeric bladder tool, and a breather layer used in the composite manufacturing process. The low pressure source is in communication with both the breather layer and the permeable middle layer.

In an embodiment, the composite fabrication system further comprises a vent plug assembly secured to the elastomeric bladder tool, wherein the vent plug assembly is in communication with the low pressure source.

In an embodiment, the vent plug assembly comprises an inner plug, and a vent plug body configured to receive the inner plug. The vent plug assembly is configured to secure an open end of the elastomeric bladder tool between the inner plug and the vent plug body such that when the open end of the elastomeric bladder tool is secured between the inner plug and the vent plug body, the permeable middle layer of the elastomeric bladder tool terminates within a cavity formed by the inner plug and the vent plug body. The cavity is in fluid communication with the low pressure source.

Although various combinations of limitations have been disclosed respecting each of the systems and methods described above, it should be appreciated that these do not constitute every limitation disclosed herein, nor do they constitute every possible combination of limitations. As such, it should be appreciated that additional limitations and different combinations of limitations presented within this disclosure remain within the scope of the disclosed invention.

These and other features and advantages of the invention should become more readily apparent from the detailed description of the preferred embodiments set forth below taken in conjunction with the accompanying drawings, which illustrate, by way of example, the principles of the invention.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

FIG. 3A provides a perspective view of a composite fabrication system in which an elastomeric bladder tool is mechanically secured to a vent plug assembly, in accordance with an embodiment of the present disclosure.

FIG. 3B provides a cross-sectional view of the composite fabrication system of FIG. 3A.

FIG. 3C provides another cross-sectional view of the composite fabrication system of FIG. 3A.

FIG. 3D provides a close-up view of the composite fabrication system of FIG. 3C.

DETAILED DESCRIPTION OF VARIOUS EMBODIMENTS

The present invention addresses problems in conventional approaches to composite manufacture by offering an elastomeric bladder tool and related systems and methods that mitigate the permeability and leak risks of elastomeric materials through an integrated, internally vented structure. In certain embodiments, the present invention provides for a tri-layer elastomeric bladder tool comprising an elastomeric outer layer, a permeable middle layer, and an elastomeric inner layer. The elastomeric inner and outer layers may be substantially impermeable, but, as discussed above, it is possible that the elastomer used to form these layers allows for some permeation of gases or fluids through the material, or through openings in the material caused by damage. The tri-layer elastomeric bladder tool addresses the problem of potential gas permeability by allowing gases that could potentially leak out to a composite structure in contact with the elastomeric bladder tool to be removed via the permeable middle layer. The relatively small volume of the middle layer in the present invention also provides a smaller volume for leak checks, overcoming limitations in leak checking systems and methods currently available. In various embodiments, the present invention can also include a vent plug assembly to be used in conjunction with the elastomeric bladder tool. The vent plug assembly can include a first gas channel in communication with an inner cavity of the elastomeric bladder tool, and a second gas channel in communication with the permeable middle layer for removal of gases via the permeable middle layer. The invention will be described in greater detail with reference to the figures.

Figure 1:
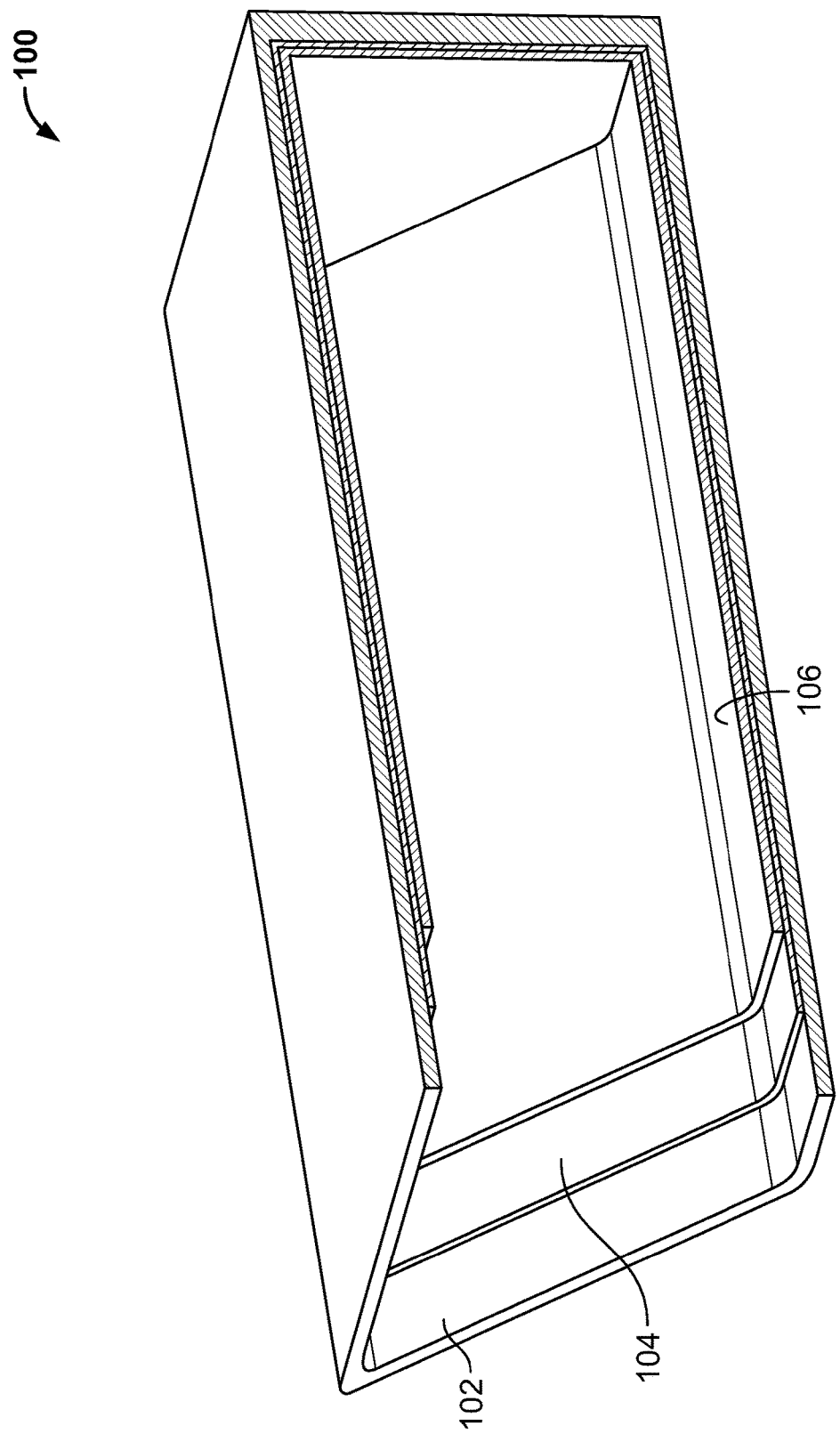
FIG. 1 provides a cross-sectional view of a tri-layer bladder tool, in accordance with an embodiment of the present disclosure.

FIG. 1 illustrates an example elastomeric bladder tool 100 in a cross-sectional view, in accordance with an embodiment of the present disclosure. The elastomeric bladder tool 100 comprises an elastomeric outer layer 102, a permeable middle layer 104, and an elastomeric inner layer 106. As discussed above, the inner layer 106 and the outer layer 102 can be formed of elastomeric materials that are of lower permeability than the middle layer. However, such elastomeric materials may allow for some permeation of gases, liquids, resins, volatiles, etc., through the material or through punctures or other defects.

The outer layer 102 can act as a gas/fluid barrier between the elastomeric bladder tool 100 and a composite laid on the outer layer 102. The outer layer 102 can interface directly with a composite during composite fabrication, or have additional barrier layers located between the composite and the elastomeric bladder tool. The outer layer 102 can be made of various elastomeric materials, such as, for example, silicone, fluoropolymers, ethylene propylene diene, natural rubber, copolymers of isobutylene and isoprene, or other elastomers or elastomer mixtures or co-polymers capable of withstanding curing conditions while being flexible. In certain embodiments, the outer layer 102 may include more than one individual layer, and can comprise a barrier material. For example, the outer layer 102 may include a barrier material that is compatible with the resin system used for the composite. In addition, fillers or reinforcements can be incorporated into the outer layer 102 such as woven or non-woven glass and/or polymer fibers. The outer layer 102 can also include heating elements such as electrical heating mats that are connected to the outside of the elastomeric bladder tool 100.

The elastomeric inner layer 106 terminates the inside of the elastomeric bladder tool 100 and defines an inner surface or inner cavity of the elastomeric bladder tool 100. In certain embodiments, the inner layer 106 can act to stabilize the permeable middle layer 104. The inner layer 106 can be made out of the same or similar elastomeric materials as the outer layer 102, or different elastomeric materials that satisfy any required flexibility and/or temperature stability requirements. The inner layer 106 can include fillers or reinforcements such as woven or non-woven glass and/or polymer fibers. The inner layer 106 can also consist of more than one layer. For example, additional inner layers can be added to add stiffness, friction with the permeable middle layer 104, and/or a barrier to limit permeation.

Elastomeric materials for either the inner layer 106 or the outer layer 102 may be selected from various groups of elastomers, such as silicone, fluoroelastomers, butyl, EPDM, or various combinations of these groups. Materials may be selected based on various factors, such as durability, durometer, temperature stability, permeability, cost, manufacturing requirements, dimensional stability, contamination concerns, and compatibility with particular composite curing conditions. The inner and outer layers may have different material selection criteria, and may, therefore, be formed of different materials. For example, in a particular use scenario, butyl may not be a desirable choice for the outer layer because of its tendency to set under compression, but may be desirable for the inner layer because of its low permeability. Similarly, silicone may not be a desirable choice for the outer layer for contamination concerns, but may be desirable for the inner layer due to manufacturing advantages. The selection of materials for the inner and/or outer layers can vary based on the particular use scenario involved.

The permeable middle layer 104 can be configured to allow gas and/or fluid transport to various regions of the elastomeric bladder tool 100. It should be understood that the terms "fluid communication," "gas communication," and "gaseous communication" are used interchangeably, and include any communication that allows for the flow of gases and/or fluids. In various embodiments, the permeable middle layer 104 allows for extraction of gases, volatiles, fluids, and/or resins, and the like, that have permeated through the outer layer 102 or the inner layer 106 due, for example, to the material's permeability, imperfections in the material, or damage to the inner and/or outer layers. The permeable middle layer 104 can be made of flexible breather materials. Such materials can include synthetic polymer or glass fabrics, or other materials that will not collapse under the pressure exerted on this layer during the composite fabrication process. In certain embodiments, the permeable middle layer 104 can be placed between the inner and outer layers 102, 106. In various embodiments, the permeable middle layer 104 can be attached to the inner layer 106, the outer layer 102, or both. The permeable middle layer 104 can be attached to either or both of the inner layer 106 and/or the outer layer 102 by, for example, molding, gluing, co-vulcanizing or other any other method that will not substantially block the flow of gases, fluids, and/or volatiles through various parts of the permeable middle layer 104 so as not to restrict flow to the edges or other convenient locations of the disclosed elastomeric bladder tool 100. In one embodiment, the permeable middle layer 104 is attached to the inner layer 106 using a narrow strip of the same elastomeric material used for the inner layer 106.

The permeable middle layer 104 can be exposed to a low pressure source, such as a vacuum or a vent at lower pressure than the pressure used to consolidate the composite part, to remove any liquids, gases, volatiles, resins, or other materials that have permeated through the inner layer 106 or the outer layer 102. The permeable middle layer 104 can be exposed directly to the vacuum source or vent, or exposed to the vacuum source or vent through another breather layer, or exposed to the vacuum source or vent using a vent plug assembly, which will be discussed in greater detail herein.

In certain embodiments, the inner layer 106 and the outer layer 102 can be fabricated by extrusion of the individual layers, by co-extrusion, by seaming elastomeric sheets, by the lay-up of uncured rubber, or by casting uncured material to include the permeable middle layer 104 as a preformed, porous material. The elastomeric bladder tool 100 can also be formed by compression molding of the inner and outer layers 106, 102, or by compression molding or seaming of the combined layers. The outer layer 102 can be produced with or without an additional barrier layer. The elastomeric bladder tool 100 can be terminated by molding an elastomer layer or plug to the end of the elastomeric bladder tool or by adding a vent plug assembly. Either end, or both ends of the elastomeric bladder tool 100 can be closed or left open. The elastomeric bladder tool 100 can be used with or without a vent plug assembly.

Figure 2:
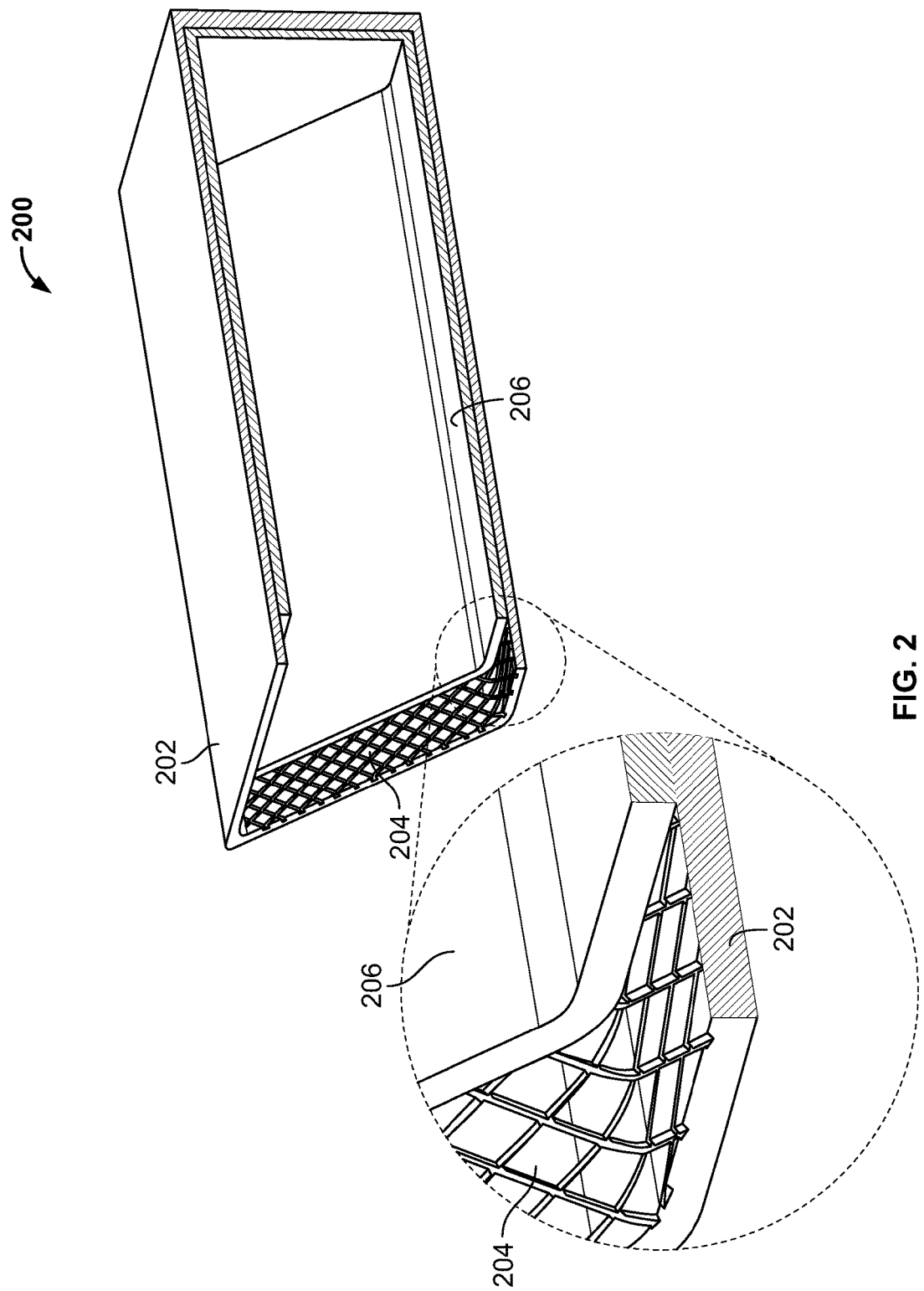
FIG. 2 provides a cross-sectional view of an alternative tri-layer bladder tool, in accordance with another embodiment of the present disclosure.

In an embodiment, the permeable middle layer can be formed of one or more textured surfaces on the inside of the outer layer and/or the outside of inner layer. The textured surface allows for gas, volatile, and/or liquid flow between the inner and outer layers. FIG. 2 illustrates an example embodiment of an elastomeric bladder tool 200 having an elastomeric outer layer 202, an elastomeric inner layer 206, and a permeable middle layer 204. In the embodiment shown in FIG. 2, the permeable middle layer 204 is created by a textured surface formed on an inner surface of the outer layer 202. The textured surface can be formed on either or both of the inner layer 206 or the outer layer 202. In this embodiment, the permeable middle layer 204 is not a distinct material layer, as was the case in the embodiment shown in FIG. 1, but is rather a textured pattern formed on either or both of the outer layer 202 and the inner layer 206. The textured grooves in the permeable middle layer 204 allow for fluids, gases, and/or volatiles to flow between the inner layer 206 and the outer layer 202.

As discussed briefly above, in certain embodiments, the elastomeric bladder tool may be used in conjunction with a vent plug assembly. FIG. 3A illustrates a perspective view of a composite fabrication system 300, in accordance with an embodiment of the present disclosure. FIG. 3B illustrates a cross-sectional view of the composite fabrication system 300 to provide greater detail as to its operation. The composite fabrication system 300 includes a vent plug assembly 302 and an elastomeric bladder tool 304 secured to the vent plug assembly 302. The elastomeric bladder tool 304 can be substantially similar to the elastomeric bladder tool 100, 200 described above with reference to FIGS. 1 and 2, and includes an elastomeric outer layer, an elastomeric inner layer, and a permeable middle layer between the inner and outer layers.

Referring now to FIG. 3B, the vent plug assembly 302 includes a vent plug body 306 and an inner plug 308. The vent plug assembly 302 and its various components can be made of suitable metals such as aluminum alloys or steel or a polymer material able to withstand the composite curing conditions. The vent plug body 306 is shaped with a concave end 310 shaped to receive the inner plug 308. An open end of the elastomeric bladder tool 304 is inserted between the vent plug body 306 and the inner plug 308, such that when the inner plug 308 is tightened into the concave end 310 of the vent plug body 306, the elastomeric bladder tool 304 is clamped between the vent plug body 306 and the inner plug 308. In the embodiment shown in FIG. 3B, clamping force is applied between the vent plug body 306 and the inner plug 308 by a tension rod 312 and a compression spring 314 (which, in certain embodiments, may also be Belleville washers). The tension rod is inserted through an opening in the inner plug 308, and received into a threaded through-bore 316 in the vent plug body 306. Complementary threads 318 are located near the approximate end of the tension rod 312 to allow the tension rod 312 to be screwed into the vent plug body 306. A hexagonal coupling socket 324 is formed on an end of the tension rod 312. A threading tool (not shown) having a complementary hexagonal male fitting can be inserted through the vent plug body 306 via an opening 322 to engage the hexagonal coupling socket 324. It should be understood that the male/female relationship can be flipped, such that the hexagonal coupling socket 324 is a male configuration, and the threading tool is a female configuration. Once engaged, the threading tool can be rotated to either draw the tension rod 312 further into the vent plug body 306 or to push the tension rod 312 out of the vent plug body 306. As the tension rod 312 is screwed further into the vent plug body 306, the compression spring 314 applies greater pressure to the inner plug 308, resulting in sufficient compressive forces to clamp the elastomeric bladder tool 304 between the inner plug 308 and the vent plug body 306. The compression spring or Belleville washers 314 continue to apply compressive forces on the inner plug 308 as the temperature and pressure conditions within the composite fabrication system 300 change during the composite fabrication process and the Coefficient of Thermal Expansion (CTE) of the materials results in dimensional changes of the components.

The sealing function of the inner plug 308 can be enhanced with additional seals on the inner plug 308. In addition to, or in place of the compressive forces described above with reference to FIG. 3B, the vent plug assembly 302 can also be bonded to the elastomeric bladder tool 304 using adhesives or other materials, similar to the elastomeric materials used for the inner and outer layers of the elastomeric bladder tool 304.

When the elastomeric bladder tool 304 is secured to the vent plug assembly 302, a path, or channel, 330 is formed via an opening 340 in the vent plug body 306 to connect a hollow inner cavity 320 of the elastomeric bladder tool 304 to a gas source for insertion of gas into the cavity 320 (e.g., to support or compress a composite structure formed on the elastomeric bladder tool 304), or to a low pressure source for extraction of gas from the cavity 320 (e.g., to deflate the elastomeric bladder tool 304 to assist extraction). The tension rod 312 is hollow so as to allow gases to flow through the tension rod 312 into or out of the cavity 320 via the opening 340.

As described above with reference to FIGS. 1 and 2, the elastomeric bladder tool 304 can include three layers, a substantially impermeable elastomeric outer layer, a permeable middle layer, and a substantially impermeable elastomeric inner layer. The permeable middle layer allows for extraction of gases, fluids, volatiles, and the like, that have leaked through the elastomeric outer layer and/or the elastomeric inner layer. FIG. 3C provides another cross-sectional view of the composite fabrication system 300 that demonstrates how the vent plug assembly 302 and the elastomeric bladder tool 304 can be used together to remove unwanted gases, fluids, or other materials from the inner and outer layers of the elastomeric bladder tool 304.

As was described above in describing FIG. 3B, the vent plug assembly 302 includes a first path, or channel, for gaseous communication with an inner cavity 320 of the elastomeric bladder tool 304. As can now be seen in FIG. 3C, the vent plug assembly 304 also includes a second channel 350 for gaseous communication with the permeable middle layer of the elastomeric bladder tool 304. As can be seen in greater detail in FIG. 3D, an open end of the elastomeric bladder tool 304 terminates within a cavity 352 formed between the inner plug 308 and the vent plug body 306. The cavity 352 leads to the channel 350. The channel 350 can be connected to a low pressure source, such as a vacuum, for drawing any materials (e.g., gases, liquids, volatiles) out through the permeable middle layer of the elastomeric bladder tool 304. It should be appreciated that selection of the material and/or structural design of the permeable middle layer should take into account the compressive forces between the vent plug body 306 and the inner plug 308, which will be exerting crushing forces on the permeable middle layer. The permeable middle layer should be such that even with the forces exerted by the vent plug body 306 and the inner plug 308, gases can still flow through the permeable middle layer for evacuation out of the permeable middle layer. In certain embodiments, the permeable middle layer can comprise a fibrous material that is porous and flexible enough to allow for gases to continue to flow through the permeable middle layer even after the elastomeric bladder tool 304 is secured to the vent plug assembly 302. Examples of such materials can include woven or non-woven glass and/or polymer fibers. In certain embodiments, the material in the compressed area of the middle layer can be made thicker than in the rest of the elastomeric tool.

Figure 4:
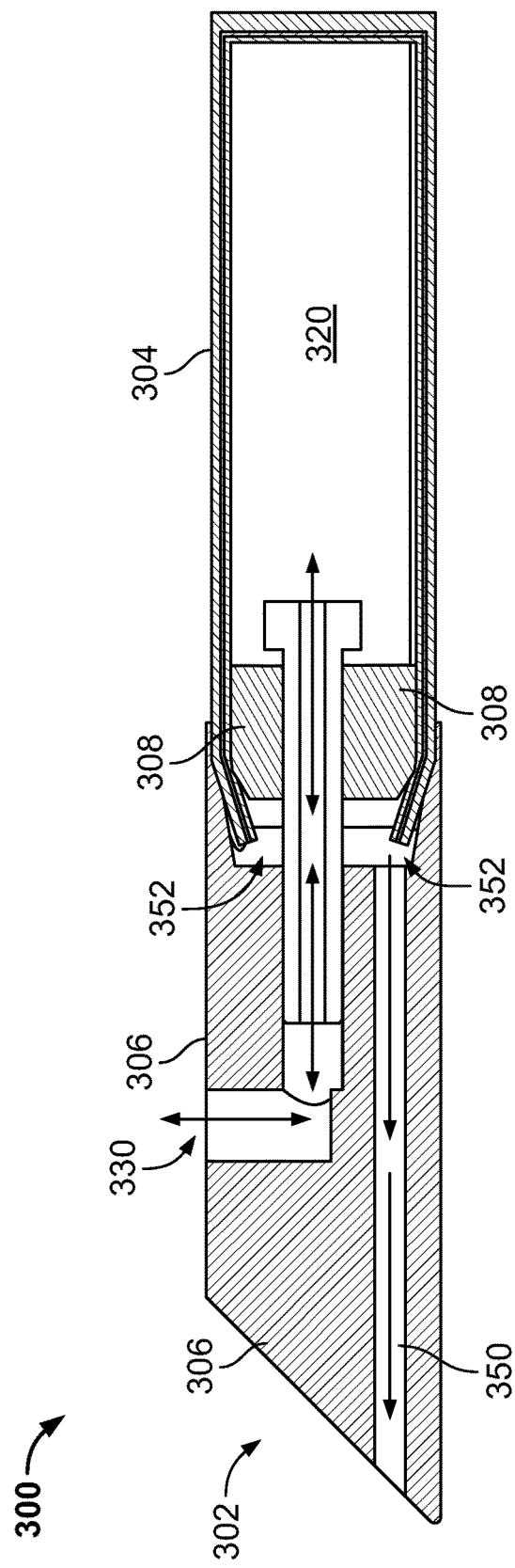
FIG. 4 provides a cross-sectional view of a composite fabrication system having multiple channels for inserting and/or extracting gases, liquids, or other materials, according to an embodiment of the present disclosure.

FIG. 4 depicts an alternative cross-sectional view of the composite fabrication system 300 to more clearly demonstrate the two separate channels 330, 350. The composite fabrication system 300 has been amended to show the second channel 350 as being located on a lower portion of the vent plug body 306, whereas FIGS. 3A and 3B depict it as being positioned on an upper portion of the vent plug body 306. However, it should be understood that the actual location of the channel 350 can vary, so long as it is in communication with the permeable middle layer of the elastomeric bladder tool 304. The first channel 330 can be connected to a first gas source or low pressure source, for insertion or withdrawal of gases from the inner cavity 320 of the elastomeric bladder tool 304. The second channel 350 can be connected to a low pressure source for evacuation of any unwanted gases, liquids, or other materials that have permeated through the inner or outer layers of the elastomeric bladder tool 304 via the permeable middle layer.

Figure 5A:
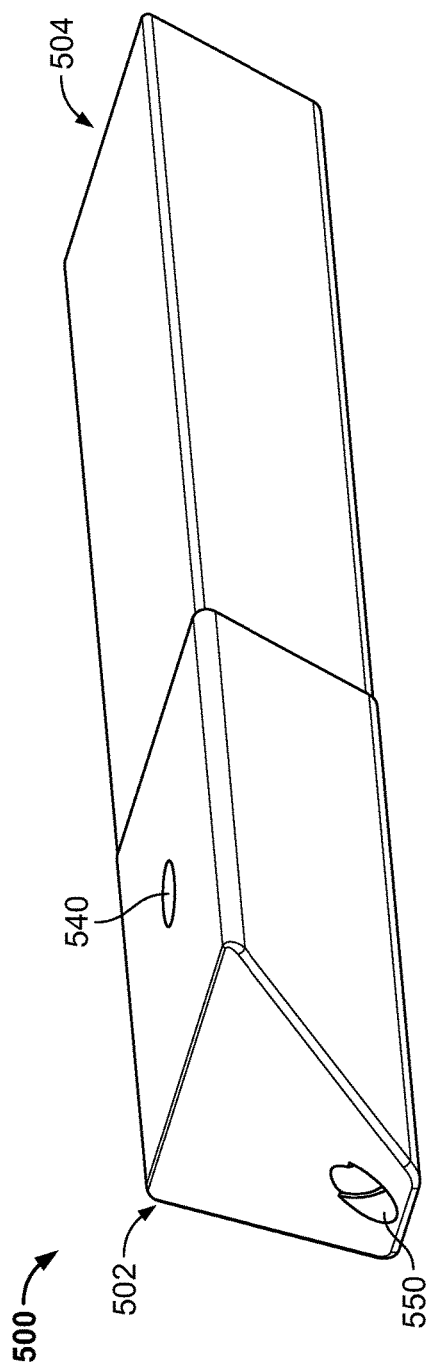
FIG. 5A provides a perspective view of a composite fabrication system in which an elastomeric bladder tool is adhesively secured to a vent plug assembly, in accordance with an embodiment of the present disclosure.
Figure 5B:
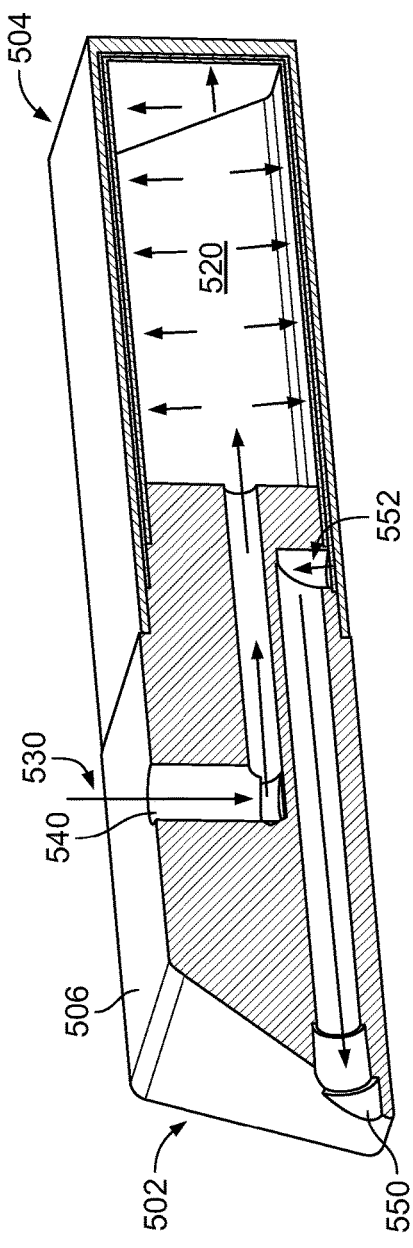
FIG. 5B provides a cross-sectional view of the composite fabrication system of FIG. 5A.

FIG. 5A provides a perspective view of a composite fabrication system 500, in accordance with an embodiment of the present disclosure. FIG. 5B provides a cross-sectional view of the composite fabrication system 500 to more clearly illustrate certain operational details of the composite fabrication system. The composite fabrication system 500 includes a vent plug assembly 502 secured to a tri-layer elastomeric bladder 504. Whereas the composite fabrication system 300 of FIGS. 3A-D had a vent plug assembly that was mechanically secured to a tri-layer elastomeric bladder, the vent plug assembly 502 of the composite fabrication system 500 is adhesively secured to the tri-layer elastomeric bladder 504. For example, a vent plug body 506 can be secured to an outer surface of the tri-layer elastomeric bladder 504 using an adhesive such as a butyl-based or silicone based adhesives, or other sealants known in the industry. Aside from the distinction of mechanical securement versus adhesive securement of the vent plug assembly to the tri-layer elastomeric bladder, the operation of the composite fabrication system 500 is largely similar to the operation of the composite fabrication system 300 described above. An opening 540 in the vent plug assembly 502 creates a channel 530 into an inner cavity 520 of the tri-layer elastomeric bladder 504. The channel 530 allows for insertion or extraction of gases from the inner cavity 520. For example, the inner cavity 520 can be exposed to an autoclave, for autoclave applications, or to atmosphere for applications where the composite is cured without autoclave assistance via the channel 530. The vent plug assembly also includes a cavity 552 and a channel 550 in communication with the permeable middle layer of the tri-layer elastomeric bladder 504. The cavity 552 and the channel 550 allow for extraction of gases or other materials from the permeable middle layer of the elastomeric bladder tool 504.

Figure 5C:
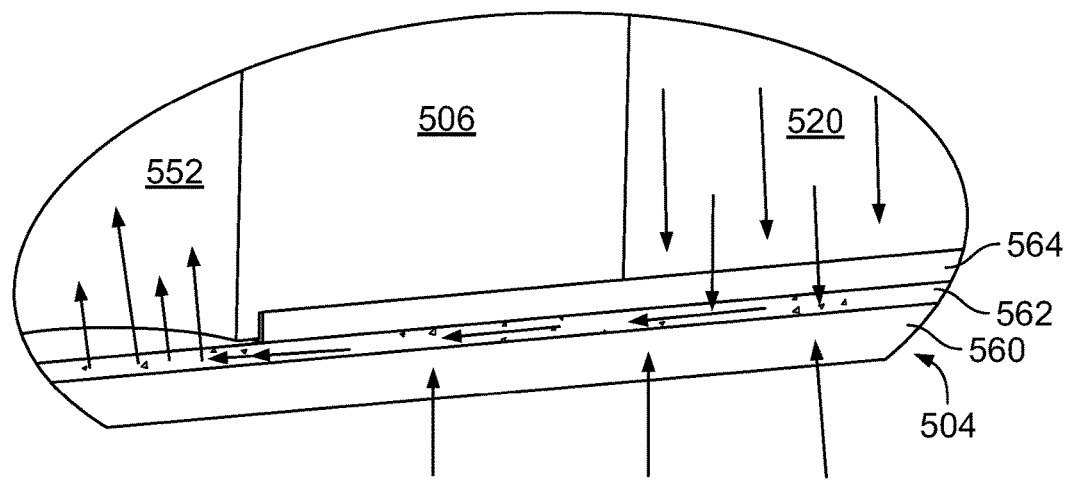
FIG. 5C provides a close-up view of the composite fabrication system of FIG. 5A.
Figure 5D:
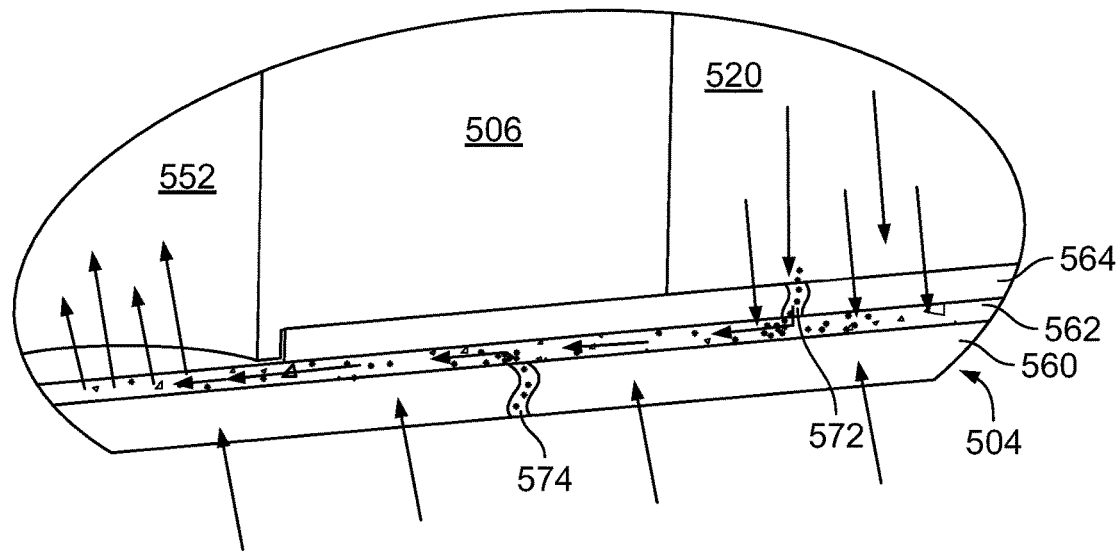
FIG. 5D provides a close-up view of the composite fabrication system of FIG. 5A.

FIGS. 5C and 5D provide close-up views of the composite fabrication system 500 to more clearly demonstrate how unwanted materials can be extracted from a permeable middle layer of the elastomeric bladder 504. The close-up view more clearly depicts an outer layer 560, a permeable middle layer 562, and an inner layer 564 of the elastomeric bladder 504. In FIG. 5C, unwanted materials are permeating through both the outer layer 560 and the inner layer 564. In FIG. 5D, a tear 572 in the inner layer 564 and a tear 574 in the outer layer 560 are permitting unwanted materials to enter the permeable middle layer 562. It can be seen in both figures that the inner layer 564 of the elastomeric bladder 504 terminates just prior to the cavity 552 so that the permeable middle layer 562 is exposed to the cavity 552. The cavity 552 is connected to the channel 550, which can be connected to a low pressure source to extract gases, volatiles, or other unwanted materials from the permeable middle layer 562 of the elastomeric bladder 504.

Figure 6:
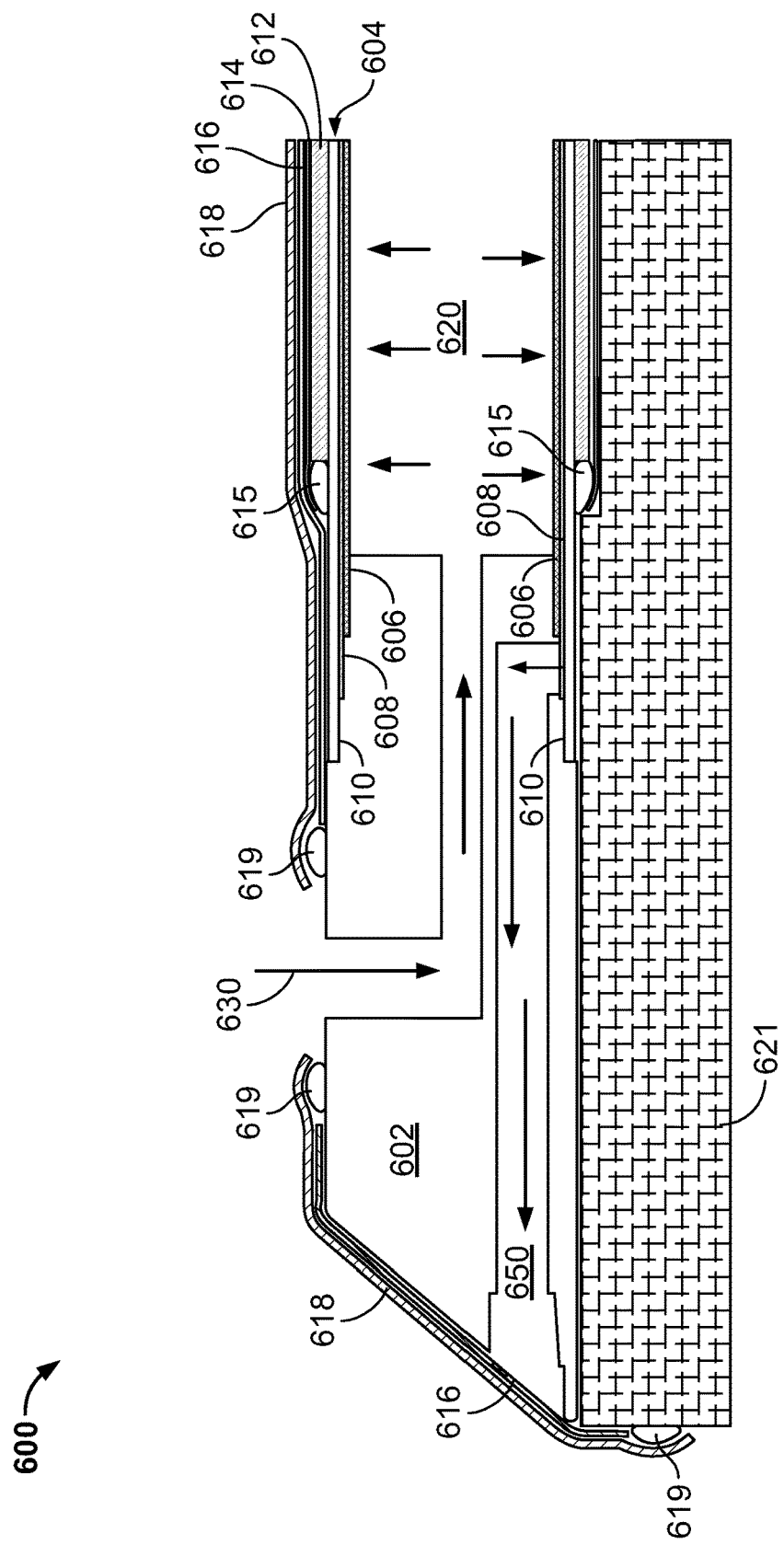
FIG. 6 provides a cross-sectional view of a composite fabrication system in which a composite has been laid over an elastomeric bladder tool, in accordance with an embodiment of the present disclosure.

FIG. 6 provides a cross-sectional view of a composite fabrication system 600, in accordance with an embodiment of the present disclosure. The composite fabrication system 600 is similar to that shown and described with respect to FIGS. 5A-D, but a composite material (or simply "a composite") has been laid on the composite fabrication system 600 for curing and/or fabrication. The composite fabrication system 600 includes a vent plug assembly 602 that is adhesively secured to an elastomeric bladder tool 604. The elastomeric bladder tool 604 includes an elastomeric inner layer 606, a permeable middle layer 608, and an elastomeric outer layer 610. A composite 612 is laid on the outer layer 610. In certain embodiments, the composite 612 may be laid on the outer layer 610 with additional layers placed between the two layers. The composite 612 may be an uncured composite that is being prepared for curing on the bladder tool 604. The composite 612 is covered by an inner bag 614. The inner bag 614 is typically made of fluorinated ethylene propylene, and is a high temperature, semi-permeable release membrane. The inner bag 614 is generally designed to keep the composite 612 from leaking out resin. The inner bag 614 is sealed to the outer layer 610 of the elastomeric bladder tool 604 using sealing tape 615 or other sealant to keep the composite 612 within the inner bag 614. The inner bag 614 can be somewhat permeable to gases to allow air and volatiles to leave the outer surface of the composite 612 and into the next layer.

The next layer is a breather layer 616, which is surrounded by a vacuum bag 618. The vacuum bag 618 seals the entire system from the outer environment, which may be, for example, an autoclave environment, which is typically at around 100 PSI. The vacuum bag 618 and the breather layer 616 work in tandem to ensure constant pressure along the composite 612. The breather layer 616 is utilized to ensure constant pressure across the composite 612 by making sure that gas has been fully evacuated from the vacuum bag 618. The breather layer 616 also removes any entrapped air that was in the composite 612 and any volatiles that may come off the composite 612 during the curing process. The breather layer 616 is typically connected to a low pressure source to constantly evacuate the breather layer 616 throughout the curing process. The vacuum bag 618 is sealed to the vent plug assembly 602 and to an underlying surface 621 using sealing tape 619 (or other sealant) to seal the entire fabrication assembly within the vacuum bag 618.

A first channel 630 allows for insertion or extraction of gases to or from an inner cavity 620 of the elastomeric bladder tool 604. In certain embodiments, the inner cavity 620 may be under high pressure from an autoclave environment. A second channel 650 is in communication with the permeable middle layer 608 to evacuate gases and other unwanted materials from the permeable middle layer 608. In the embodiment shown in FIG. 6, the second channel 650 is in communication with the permeable middle layer 608 and the breather layer 616. As discussed above, the breather layer 616 is typically connected to a low pressure source to evacuate gases or volatiles from the breather layer 616. By connecting the permeable middle layer 608 to the breather layer 616, the same vacuum source can pull gases and other materials from both the breather layer 616 and the permeable middle layer 608.

Figure 7:
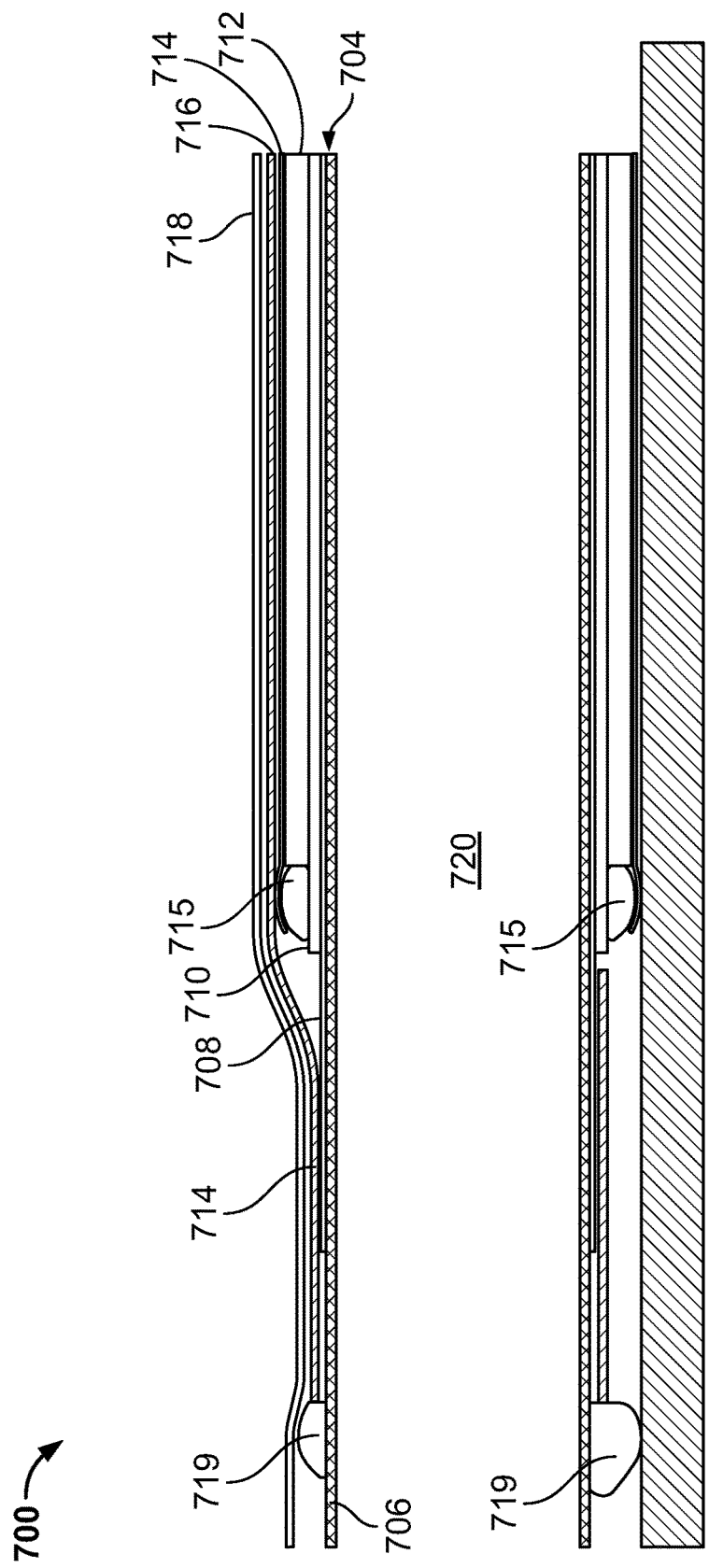
FIG. 7 provides a cross-sectional view of a composite fabrication system without a vent plug assembly, in accordance with an embodiment of the present disclosure.

While several of the previously discussed embodiments of composite fabrication systems have involved an elastomeric bladder tool secured to a vent plug assembly, it is contemplated that the elastomeric bladder tool disclosed herein can be used without a vent plug assembly. FIG. 7 shows a composite fabrication system 700, in accordance with an embodiment of the present disclosure. The composite fabrication system 700 includes an elastomeric bladder tool 704 having an elastomeric inner layer 706, a permeable middle layer 708, and an elastomeric outer layer 710. A composite 712 is laid on the elastomeric outer layer 710, and an inner bag 714 surrounds the composite 712. The inner bag 714 is sealed using a sealant 715 to keep the composite 712 within the inner bag 714. A breather layer 716 is laid over the inner bag 714, and a vacuum bag 718 surrounds all the other layers. The vacuum bag 718 is sealed to the elastomeric inner layer 706 using a sealant 719. An inner cavity 720 of the elastomeric bladder tool 704 can be exposed to a gas path, for example, to an autoclave, for autoclave applications, or to atmosphere for applications where the composite is cured without autoclave assistance.

It can be seen in FIG. 7 that in this embodiment, the elastomeric outer layer 710 terminates before the permeable middle layer 708, so that the permeable middle layer 708 is exposed and in communication with the breather layer 714. As discussed previously, the breather layer 714 is typically connected to a low pressure source to remove gases and other unwanted materials from the breather layer 714. By exposing the permeable middle layer 708 to the breather layer 714, the same low pressure source can extract gases from both the breather layer 714 and the permeable middle layer 708. While exemplary embodiments have been shown using particular layers arranged in a particular order, it should be understood that each "layer" described above may comprise multiple layers, or various layers may be ordered differently, or additional layers not described may be incorporated. For example, whereas FIGS. 6 and 7 show a composite layer applied directly to an elastomeric outer layer of a bladder tool, additional layers may be placed between the bladder tool and the composite layer.

Figure 8:
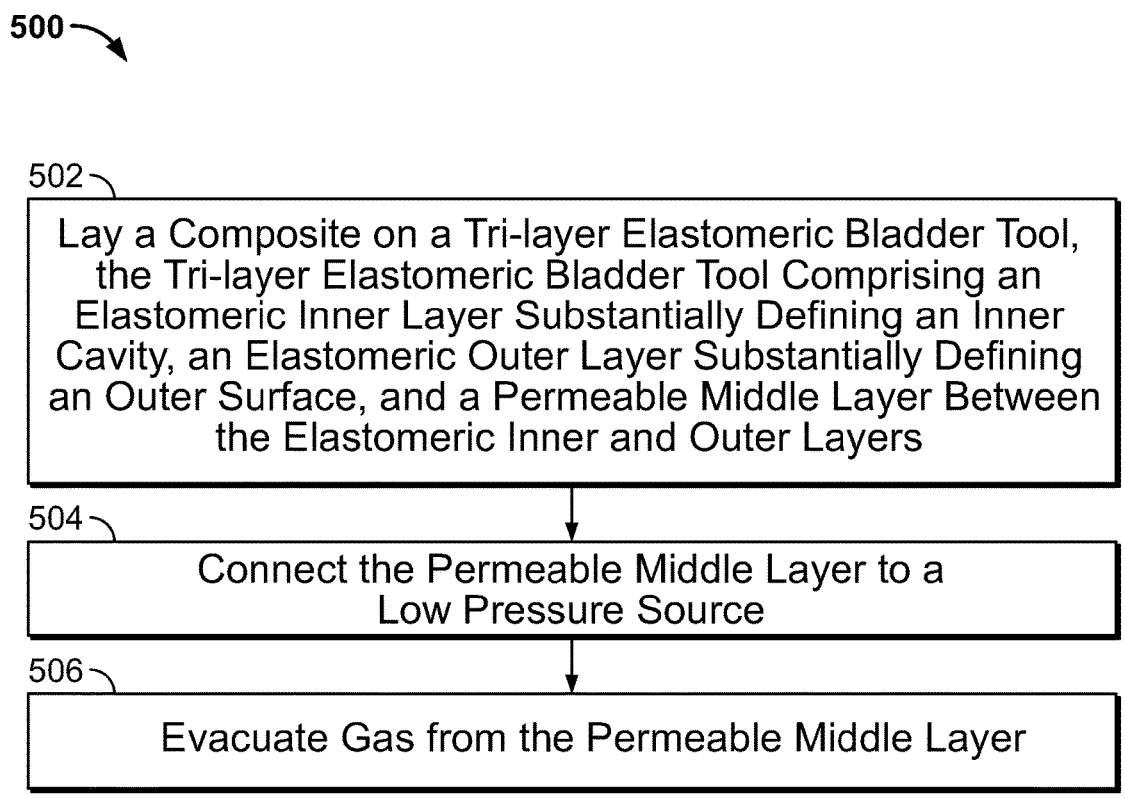
FIG. 8 provides a flow chart of an example method associated with composite fabrication, in accordance with an embodiment of the present disclosure.

FIG. 8 depicts a flow chart of an example method 500 associated with composite fabrication using a tri-layer elastomeric bladder tool. At block 502, the example method 500 can lay a composite on a tri-layer elastomeric bladder tool, the tri-layer elastomeric bladder tool comprising an elastomeric inner layer substantially defining an inner cavity, an elastomeric outer layer substantially defining an outer surface, and a permeable middle layer between the elastomeric inner and outer layers. At block 504, the example method 500 can connect the permeable middle layer to a low pressure source. At block 508, the example method 500 can evacuate gas from the permeable middle layer.

While various embodiments of the disclosed technology have been described above, it should be understood that they have been presented by way of example only, and not of limitation. Likewise, the various diagrams may depict an example structure or configuration for the disclosed technology, which is done to aid in understanding the features and functionality that can be included in the disclosed technology. The disclosed technology is not restricted to the illustrated example structures or configurations, but the desired features can be implemented using a variety of alternative structure and configurations. Indeed, it will be apparent to one of skill in the art how alternative functional, logical or physical partitioning and configurations can be implemented to implement the desired features of the technology disclosed herein. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular structure or configuration.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. An elastomeric bladder tool comprising
    a substantially impermeable elastomeric inner layer substantially defining an inner cavity of the elastomeric bladder tool;
    a substantially impermeable elastomeric outer layer substantially defining an outer surface of the elastomeric bladder tool; and
    a permeable middle layer positioned between the substantially impermeable elastomeric inner layer and the substantially impermeable elastomeric outer layer,
    wherein the permeable middle layer has greater permeability than both the substantially impermeable elastomeric outer layer and the substantially impermeable elastomeric inner layer to allow for evacuation of gases that have entered the permeable middle layer.

2. The elastomeric bladder tool of claim 1, wherein the permeable middle layer comprises a fibrous material.

3. The elastomeric bladder tool of claim 2, wherein the fibrous material is a woven, fibrous material.

4. The elastomeric bladder tool of claim 2, wherein the fibrous material comprises a fiber selected from the group consisting of glass fibers and polymer fibers.

5. The elastomeric bladder tool of claim 1, wherein the permeable middle layer is a textured surface on at least one of the elastomeric outer layer and the elastomeric inner layer.

6. The elastomeric bladder tool of claim 1, wherein the elastomeric outer layer comprises an embedded heater.

7. The elastomeric bladder tool of claim 1, wherein the permeable middle layer includes an embedded heater.

* * * * *